M. DAVIS.
NUT AND FRUIT BOWL.
APPLICATION FILED JUNE 28, 1916. RENEWED JULY 17, 1918.

1,277,200.

Patented Aug. 27, 1918.

Inventor
Morton Davis
By his Attorney

UNITED STATES PATENT OFFICE.

MORTON DAVIS, OF NEW YORK, N. Y.

NUT AND FRUIT BOWL.

1,277,200.　　　　Specification of Letters Patent.　　Patented Aug. 27, 1918.

Application filed June 28, 1916, Serial No. 106,405. Renewed July 17, 1918. Serial No. 245,403.

*To all whom it may concern:*

Be it known that I, MORTON DAVIS, a citizen of the United States, and a resident of New York, county and State of New York, have invented a certain new and useful Improvement in Nut and Fruit Bowls, of which the following is a full, clear, and exact specification.

This invention relates to a class of articles adapted for use on dining tables.

My invention has for its object primarily to provide a bowl designed to be employed for permitting nuts, fruit and like edibles to be temptingly displayed as well as being convenient for consumption in dining rooms and elsewhere, and wherein is provided a receptable having an elevated carrier with apertures or pockets to allow a number of implements to be removably mounted therein for ready use by the consumer of the contents of the bowl.

Other objects of the invention are to provide in the receptable under the carrier a pocket member to co-act with the carrier for properly supporting the implements as well as tending to prevent the interior of the receptable from being damaged; and to provide a nut and fruit bowl of a simple construction which may be made in various sizes of plain, or very ornamental designs.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawing, Figure 1 is a perspective view of one form of nut and fruit bowl embodying my invention.

Figure 1:
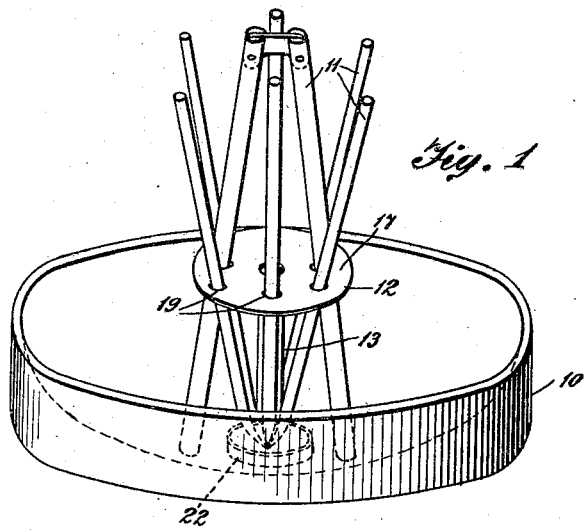
Figure 2:
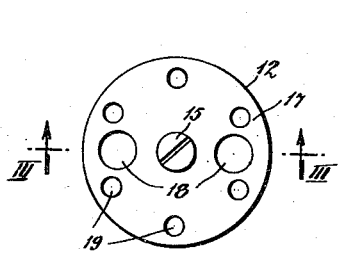
Fig. 2 is a top view of the carrier used in the bowl.
Figure 3:
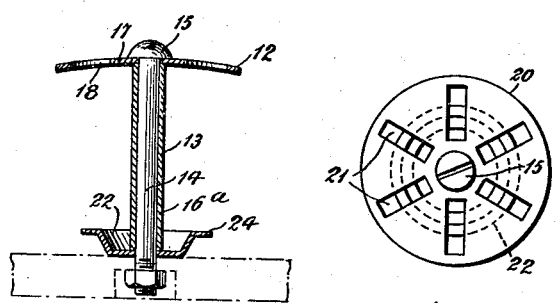
Fig. 3 is an enlarged fragmentary view showing a section taken through the carrier of the bowl.

The nut and fruit bowl has a receptable 10 which may be of any desired shape and size, though the bowl is preferably round with an open top for holding a suitable quantity of nuts, fruit and other edibles for being invitingly displayed on a dining table and elsewhere for consumption.

In order to permit a number of implements, as 11, such as nut crackers and nut pickers to be removably mounted in the bowl for convenient use by the consumer, in the receptable 10 is provided a carrier, as 12. The carrier 12 has a stationary post 13 which may be of any suitable type, though this post is preferably composed of a bolt 14 with a threaded lower end and a head 15 on its upper end. The threaded end of the bolt 14 is passed through an opening provided through the center of the bottom of the receptacle 10, and on this threaded end of the bolt is a nut 16 which is screwed so as to engage the underside of the bottom of the receptacle. On the bolt above the bottom of the receptacle is a sleeve 16ᵃ which is of a length less than the part of the bolt between the receptacle and the head 15 of the bolt. On the bolt 14 between its head and the sleeve 16ᵃ is an annular member or disk, or plate 17 which is longitudinally disposed so as to overhang the post 13 in an elevated position above the interior of the receptacle. Through the disk 17 may be a number of spaced orifices, as 18, of diameters to permit the ends of the handles of a nut cracker to be removably inserted therein for supporting the implement in an upright position, and also through the disk may be a number of spaced smaller orifices 19 for allowing a number of nut pickers to be removably mounted on the disk preferably in upright positions, as shown.

Figure 4:
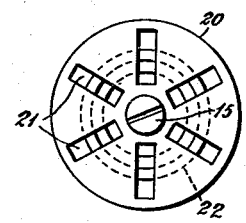
Fig. 4 is a top plan of a slightly different form of the carrier.

When the bowl is made to hold especially fruit, instead of the orificed disk 17 I prefer to employ a form of annular member, or disk, or plate, as 20 Fig. 4. The disk 20 is mounted on the bolt 14 between its head 15 and the sleeve 16ᵃ so as to overhang the post 13 in an elevated position above the interior of the receptacle 10 similar to the arrangement of the orificed disk 18. At spaced intervals through the disk 20 are a number of orifices 21 in the forms of slots disposed radially with respect to the post 13 so that implements, such as fruit knives, may be inserted through each slot for being disposed in upright positions.

The implements when mounted in the orificed, or slotted disks of the carrier 12 should be arranged so that their pointed ends will be on the top of the interior of the receptacle 10, and to prevent the implements from damaging the surface of the receptacle as well as holding them in upright positions, on the bolt 14 of the carrier 12, and between the lower end of the sleeve 16ª and the receptacle is a pocket member 22 which may be of a form having a substantially cup-shaped body 23 surrounding the bolt and the sleeve of the carrier as well as having an outwardly projecting annular flange 24. The lower ends of the implements when disposed in the disks of the carrier 12 will rest in this pocket member, and in turn the interior of the bottom of the receptacle will be prevented from being damaged by the implements.

Figure 6:
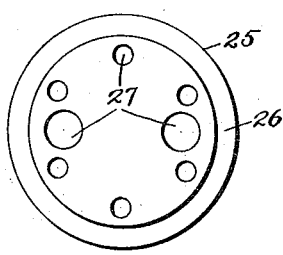
Fig. 6 is a view looking down on the carrier of the bowl shown in Fig 5.
Figure 5:
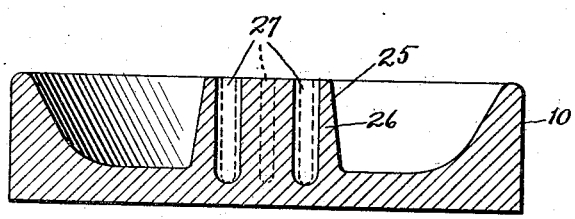
Fig. 5 is a longitudinal vertical section taken through a slightly different form of the bowl.

Illustrated in Figs. 5 and 6 is a type of the bowl wherein the carrier, as 25, for holding the implements is made in the form of a block, or post 26 projecting upwardly from the center of the interior of the receptacle 10. This post may be of any suitable shape and size and in the post may be one, or a number of spaced pockets, or recesses, as 27, all of which are preferably upwardly disposed to allow, for instance a nut cracker and a number of nut pickers to be removably inserted therein in a manner similar to the use of the carrier 12. Thus by the use of this bowl nuts, fruit and like edibles may be temptingly displayed as well as being convenient for consumption in dining rooms and elsewhere.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. In a nut and fruit bowl, a receptacle, a post projecting upwardly from the interior of said receptacle, a series of pockets in said post spaced radially around the center thereof, each pocket being adapted to hold a nut pick therein, and a pair of larger adjacent pockets in said post adapted in conjunction to hold the handles of a nut cracker.

2. An article of the character described comprising a hollow bowl-like receptacle having upstanding walls, a projecting part supported in the center of the receptacle and terminating substantially in line with the upper edge of the walls, said upstanding part having a relatively wide top portion formed with a plurality of separated sockets arranged in circular formation for receiving and supporting nut picks, the upstanding part being also formed well within its borders with sockets for receiving and supporting a nut cracker, substantially as described.

This specification signed and witnessed this 27th day of June A. D. 1916.

MORTON DAVIS.

Witnesses:
GEORGE F. BENTLEY,
C. SHRIGLEY.

Copies of this patent may be obtained for five cents each, by addressing the "Commissioner of Patents, Washington, D. C."